United States Patent [19]
Bonomi et al.

[11] Patent Number: 4,995,148
[45] Date of Patent: Feb. 26, 1991

[54] ROBOTICALLY CONTROLLED MULTI-TASK END EFFECTOR

[75] Inventors: Giovanni B. Bonomi; Battistino Oldani, both of Rockford, Ill.

[73] Assignee: IMTA, Rockford, Ill.

[21] Appl. No.: 502,541

[22] Filed: Mar. 30, 1990

[51] Int. Cl.$^5$ .................. B23B 39/18; B25J 11/00
[52] U.S. Cl. .................... 29/26 A; 33/644; 414/730; 901/41
[58] Field of Search .............. 29/568, 39, 26 R, 26 A, 29/40, 50, 53; 414/729, 730; 901/30, 41, 45; 294/86.4; 33/558, 560, 644

[56] References Cited

U.S. PATENT DOCUMENTS

| | | | |
|---|---|---|---|
| 4,242,017 | 12/1980 | DeFazio | 901/41 |
| 4,316,329 | 2/1982 | Watson | 901/45 X |
| 4,332,066 | 6/1982 | Hailey et al. | 29/26 R |
| 4,517,744 | 5/1985 | Consales | 33/644 |
| 4,571,148 | 2/1986 | Drazan | 414/730 |
| 4,573,271 | 3/1986 | Hamilton et al. | 33/558 |
| 4,635,827 | 1/1987 | Roedig | 901/41 X |
| 4,691,419 | 9/1987 | Keezer et al. | 29/39 |
| 4,797,564 | 1/1989 | Ramunas | 901/41 x |
| 4,885,836 | 12/1989 | Bonomi et al. | 29/34 B |

Primary Examiner—William Briggs
Attorney, Agent, or Firm—McCaleb, Lucas & Brugman

[57] ABSTRACT

A multiple-task end effector attachable to the articulatable head of a computer controlled robotic machining center or "robot" operable to impart multiple linear and rotational axis movements to the end effector which comprises a tool head attachable to the mobile head of the robot for carrying a plurality of working tools held by a power actuated shuttle. The shuttle is selectively operable to position or index each tool carried thereby to a position of coaxial alignment with the central axis of the robot's mobile head and the end effector's tool head. In operation two robots are positioned on opposite sides of fixture held work pieces so that end effectors attached thereto are coaxially aligned and operable to clamp work pieces therebetween with measured, balanced forces. The shuttle of at least one end effector is selectively actuated to present tools for forming and preparing holes through the work pieces followed by insertion and installation of suitable fasteners, such as rivets, bolts or the like without unclamping the work pieces.

14 Claims, 8 Drawing Sheets

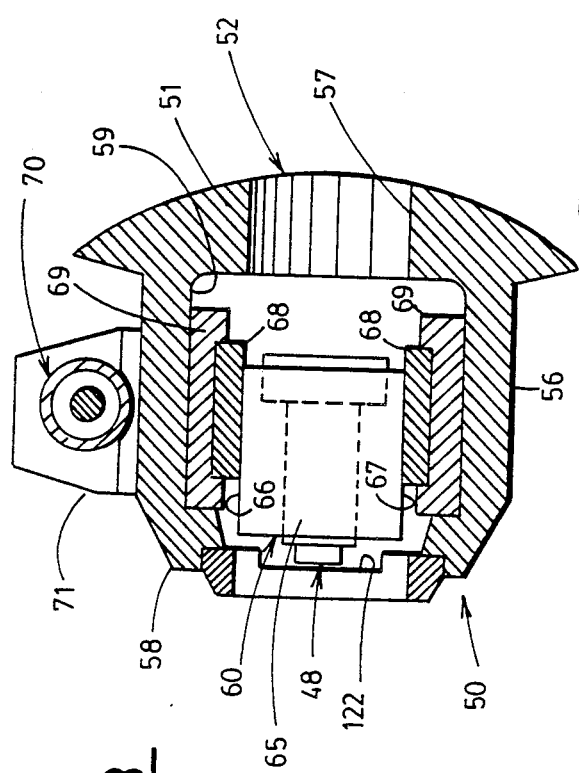
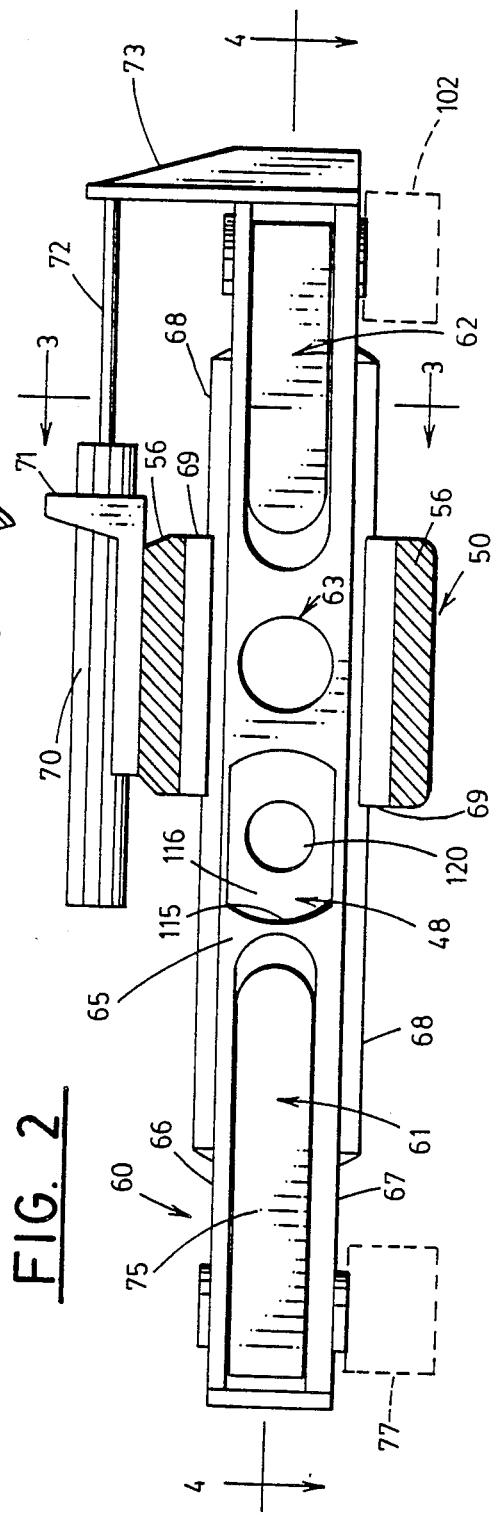
FIG. 3
FIG. 2

ROBOTICALLY CONTROLLED MULTI-TASK END EFFECTOR

This inventions relates generally to the fastening art and more specifically is directed to improvements in tooling attachments useful with robotic machining centers for the purpose of automating the assembly and integration of parts by means of rivets or similar fasteners.

Modern day manufacturing technology has adopted computer controlled robots equipped with one or more drive spindles capable of driving various machine tools, which are adapted to be selectively positioned and located, to carry out a variety of automatic machining operations.

More recently such robots have been adapted to the application of rivets and similar fasteners wherein a pair of robots working in mirror relationship operate to automatically carry out the fastening procedures on opposite sides of fixture held assembly parts. Apparatus of this order is revealed in U.S. Pat. No. 4,885,836 issued Dec. 12, 1989 to the assignee of this application and to which reference is made herein for an amplified description of the operational context of a twin robot installation for assembling aircraft wing and fuselage sections to which the end effector of the present invention is particularly adapted.

BRIEF SUMMARY OF THE INVENTION

The present invention constitutes an improvement in end effectors useful with a pair of computer controlled robots working on opposite faces of fixture held assembly parts of the order set out in the aforenoted U.S. Pat. No. 4,885,836, in which the robots accommodate individual end effectors carrying individual tools for effectuating the formation of holes through the assembly parts and the installation of rivet fasteners and the like therein.

According to this invention a first end effector is attached to the tool head of a first robot and carries a plurality of operating tools, such as rivet fastener feeding and placement means, hole forming and counter sinking means (operated by the tool spindle of the robot's tool head), rivet setting bucking bar means and means for applying sealant to the fastener opening formed through the assembled parts. Such various tools are operable at separate stations of a moveable shuttle which is under computer control to index the several tool means into operating positions whereat they are aligned coaxially with the robot's tool spindle. A second end effector attached to opposingly disposed robot head cooperates with the first end effector to clamp the assembled parts therebetween and carries appropriate rivet setting hammer means for upsetting the rivet in fastening position. Other arrangements and organization of specific tools carried by the end effectors are fully contemplated under this invention.

The preferred tooling arrangement described hereinafter is such that each hole is formed through the clamped fixture held parts and prepared for fastener reception followed by the installation of the fastener while the two end effectors remain in a single clamping position. Alternately, all holes to be formed in the assembled parts may be prepared in succession and the robotically controlled end effectors and tool heads subsequently relocated opposite each previously formed hole for installation of selected fasteners, in the manner described more particularly in the aforementioned U.S. Pat. No. 4,885,836, however, without the need for changing end effectors for each tool operation.

It is an important object of this invention to provide a novel and improved multiple tool carrying end effector attachment for the mobile tool head of a robotic machining center or "robot".

Another important object of this invention is to provide an improved end effector for use with the mobile head of a robot which permits a single robot to carry out plural selected machine tool operations while the end effector is held in a fixed position of engagement with parts to be assembled.

Another important object of this invention is to provide an improved end effector attachable to the head of a computer controlled robot which may be spatially positioned about plural linear and rotational axes and which is operable in conjunction with an opposing robot and end effector to install fasteners in fixture held parts.

Still another object of this invention is to provide a robotically controlled end effector which embodies a self aligning nose piece engageable with parts to be assembled and means for indicating its condition of alignment.

An additional object of this invention is to provide an end effector attachable to the mobile head of a robotic machining center which embodies selectively operable means for feeding and inserting rivets into a preformed opening in fixture held work pieces and improved means for applying sealant to such opening.

Having described this invention the above and further objects, features and advantages thereof will be recognized by those familiar with the art from the following detailed described of a preferred embodiment of the invention, illustrated in the accompanying drawings and representing the best mode presently contemplated for enabling with those of skill in the art to carry out and practice this invention.

IN THE DRAWINGS

FIG. 2 is an enlarged cross sectional view with parts in elevation taken substantially along vantage line 2—2 of FIG. 1 and looking in the direction of the arrows thereon;

FIG. 3 is another partial cross sectional view taken substantially along vantage line 3—3 of FIG. 2 and looking in the direction of the arrows thereon;

DESCRIPTION OF THE PREFERRED EMBODIMENT

Figure 1:
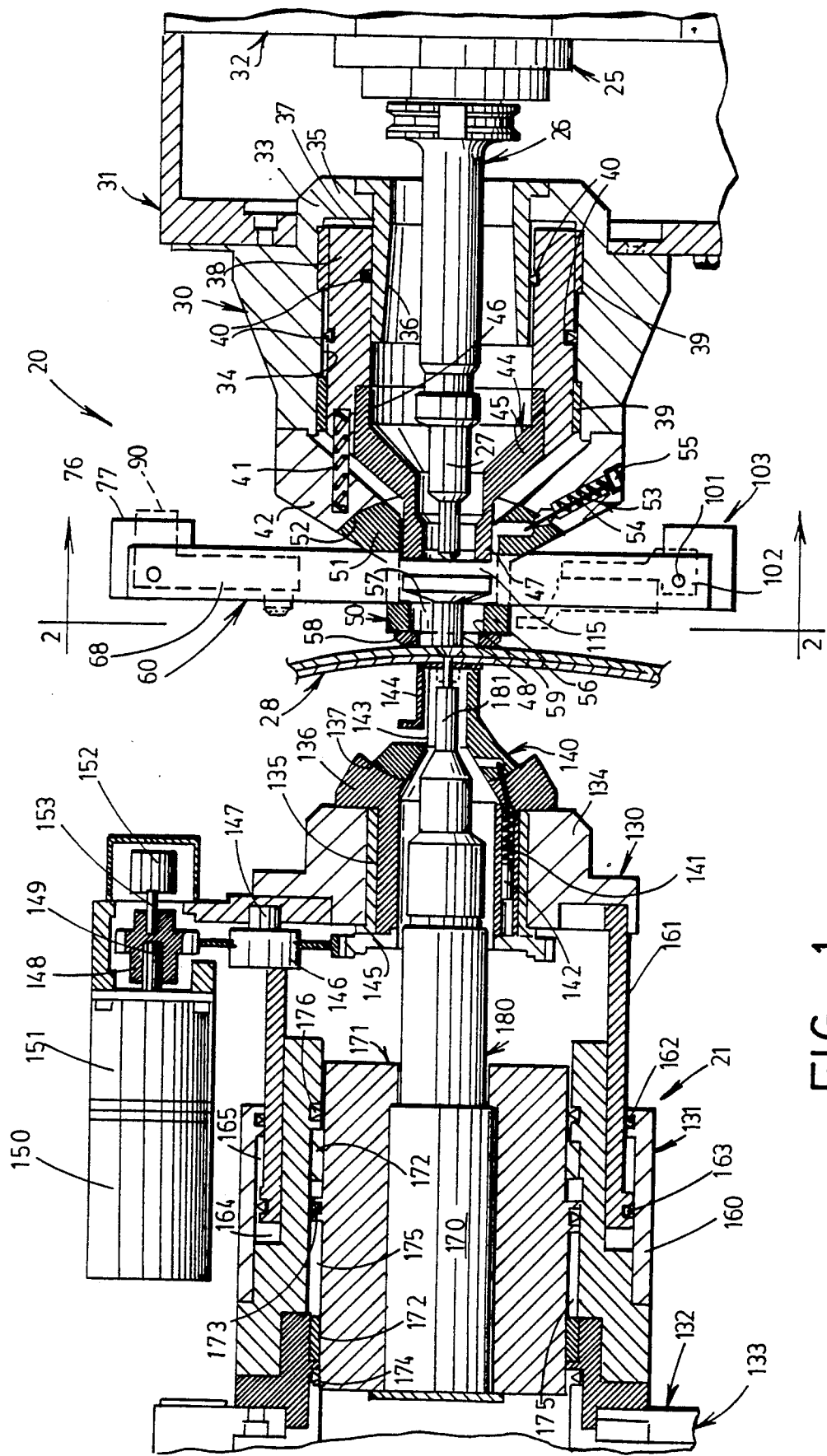
FIG. 1 is plan view in with portions in section, of a pair of cooperating robot mounted end effectors for installing rivets according to this invention.

The present invention is particularly adapted for installation of rivet fasteners and the like in a work cell environment of the character more fully described in the above identified U.S. Pat. No. 4,885,836.

Briefly as disclosed in such patent a pair of high speed machining centers or "robots" of cartesian structure, having linear horizontal, vertical and transverse X, Y and Z axes are employed in the work cell. The X axis of each robot is generally defined by associated horizontal linear bedways along which the robot is moved by power actuated means; the Y axis by a central vertical column of the robot and the Z axis by a horizontal ram moveable along a linear axis transverse to the vertical column.

In addition, the robot's vertical column is rotatable about its central axis and a twist head is mounted at the outer end of the ram for rotation about a pair of transversely related rotary axes. The twist head also is equipped with a rotatable quill defining a linear axis along which tools affixed thereto are advanced and retracted. Thus, each robot embodies three principal linear movement axes and three rotary movement axes for spatially positioning the robot's twist head.

Located intermediate the two robots in the work cell is an automatic flexible or adjustable fixture for holding parts and components to be assembled, such as wing panels and ribs or fuselage sections for an airplane. The two robots normally work in mirror relationship on opposite sides of the fixture held components with the fixture being placed parallel to and between the X-axes of the two robots.

The entire work cell is importantly controlled by a host computer which receives computer aided manufacturing (CAM) instructions via direct numeric control (DNC) or other means as well as operator controlled instructions which determine and or modify the design of the end assembly. All output signals are sent from the host computer to pertinent lower level computers and as instructions are performed by the robots, feedback signals are returned to the host computer.

Generally speaking the host computer instructs subcomputers which control the selection of tools and end effectors to enable the robots to be equipped with the correct tools and supplied with the correct fastener for the desired fastening operation. The host computer also manages the appropriate sequence of movements of robot operation including clamping, hole preparation, inserting and setting of the fasteners, as well as, positioning and operating the fixture to satisfy the geometry of parts to be assembled.

Robotic machine tools capable of carrying out such above briefly outlined tasks are available from several commercial sources such as that marketed by JOBS, of Piacenza, Italy, as an example of a machine having the necessary versatility and high accuracy in positioning working tools required by this invention. For instance, such a machine must be capable of drilling, counter sinking, milling, routing, net trimming, impacting and other machining and measuring operations, along with other operating and related tasks as are more fully described in the aforesaid U.S. Pat. No. 4,885,836.

With reference to the end effectors described and employed in the robotically controlled system set forth in said U.S. Pat. No. 4,885,836 it will be recognized that such are limited in their operational performance in that each machining operation or separate function require a separate individual end effector devoted to that single task. Consequently at the completion of each task the robots are required to change end effectors to accomplish the next procedural task. By way of contrast, the present invention concerns an end effector capable of performing multiple tasks so that a pair of robots equipped with appropriate end effectors, are capable of initiating and completing a complete multiple task cycle such as the preparation of rivet holes and installation of rivets in fixture held parts or components, without detachment from the associated robots.

With specific reference to FIG. 1, it will be understood that two cooperating robots (not shown) are equipped with opposing end effector assemblies 20 and 21, respectively. Such robots are capable of imparting multi-axis movements to their end effectors as discussed above.

End effector 20 constitutes a multi-task apparatus while end effector 21, as herein illustrated, is dedicated to a single task, requisite to the installation of rivet fasteners according to the herein set forth illustrative embodiment of this invention.

In general the robot which supports end effector 20 comprises a rotatably driven spindle and quill 25 receptive of a coaxially extending tool holder 26 which is rotatably driven with the quill 25 and also is moveable linearly along the robot's quill axis. Such movement serves to advance and retract a drill and countersink tool 27 mounted at the outer end of tool holder 26. Tool 27 is employed to form openings through fixture held work components, indicated at 28.

End effector 20 comprises a generally cylindrical head 30 with attached interface bell 31 having a face plate 32 equipped for connection to the twist head of its robot by means of a conventional automatic coupling system known in the art. In addition to the coupling system for cooperation with the twist head of the robot, bell 31 also embodies means which automatically interconnect with appropriate pneumatic, hydraulic and electrical power sources and connectors associated with the robot for activating power systems of the end effector as will appear hereinafter.

Adjoining the interface bell 31 is the main body 33 of the end effector head 30 which is hollow and has a cylindrical interior chamber wall 34. The latter wall defines with a traversly related annular skirt portion 35 and a radially inwardly located annual wall member 36, affixed to such skirt portion, a cylindrical piston chamber 37 concentric with the chamber wall 34.

A relatively heavy and massive annular bucking bar piston 38 fits in the piston chamber 37 which is open at one forward end for reception of the piston. Suitable bearings 39, 39 support the piston for limited reciprocal movement and spaced seals 40, 40, operate to maintain the sealed integrity of the cylinder 37 with walls 34 and 36. Thus introduction of pneumatic pressure into one end of piston chamber 37 operates to advance the piston 38 toward the outer end of the end effector body 33. Such advancing movement of the piston 38 is opposed by plural circumferentially spaced return springs 41 extending between the body of piston 38 and a generally frustro-conical shaped outer end section 42 of end effector body 33. Selected regulation of the air pressure in piston chamber 37 regulates the compression of the springs 41 and thus the load resistance of the bucking bar 44 affixed to the outer end of piston 38. Relief of the pneumatic pressure in cylinder 37, effects reverse movement of piston 38 by return springs 41.

As best seen in FIG. 1, the bucking bar 44 extends from the outer end of piston 38 and is formed with a frustro-conical body 45 having a cylindrical skirt 46 secured to piston 38 and a coaxial cylindrical outer end portion 47 adapted to abut a bucking bar bushing 48, as will appear in greater detail presently.

Mounted on the outer end of section 42 of the end effector body 33 and in coaxial relation to the bucking bar 44 is a nose piece 50 which is seen in greater particular in FIG. 3 of the drawings. As noted therein, the nose piece is formed with a base end 51 having a convex semi-spherical outer surface 52 which slidably mates with an annular semi-spherical concave surface formed at the terminal or outer end of section 42 of the end effector body. Nose piece 50 is held moveably in place by three or more coil spring systems 53 disposed at 120° intervals about the nose piece circumference and comprising connector rods 54 operable to interjoin the nose piece and end section 42. Sensor means 55 are coupled to each of the spring/rod assemblies to sense movement of the nose piece out of coaxial alignment with the robot's quill axis. Such sensing data is fed to the end effector control and master computers to indicate the positional alignment of the nose piece. In this regard it will be understood that the movability of the nose piece permits the same to follow the curvature of the work pieces 28. Consequently, if the nose piece sensors indicate an alignment thereof other than coaxial with the robot's quill axis, the robot's twist head is appropriately adjusted to insure proper coaxial alignment with the nose piece prior to a machining operation.

Nose piece 50 is further distinguished by a generally rectangular shaped body or foot bush 56 which extend coaxially outward of one side of the spherical ended base 51 thereof. Foot bush 56 has a hollow interior which openly communicates at one end with a cylindrical passageway 57 formed through base 51 for tool entry, such as the drill bit 27 or the bucking bar end portion 47. The opposite or outer end of foot bush 56 is likewise open to provide coaxial passage of various work tools, such as drill bit 27. The mouth of such outer open end is bordered or surrounded by an annular pressure responsive sensor 58 which signals the end effector control computer when the nose piece contacts the work pieces 28 preliminary to initiation of a tool working operation, such as drilling a hole through the work pieces.

Mounted for sliding movement transversely through side openings 59 of the nose piece 50 is an elongated and generally rectangular shaped shuttle means 60, best shown in FIGS. 1-4 of the drawings. The shuttle indexes various tools and operating stations into and out of a working position of coaxial alignment with the central axis of the nose piece.

While there may be a variety of selected tool operating stations for the shuttle means 60, in the particular embodiment illustrated herein, the shuttle comprises four stations, three of which carry tools, namely, a sealant applicator 61, bucking bar bushing 48, and a rivet feed system 62. The fourth station constitutes a drilling station 63 for passage of the drill bit 27 (see FIG. 4).

In order to index or move the various stations of the shuttle means to insure tool operation coaxially of the nose piece 50, the elongated body 65 of the shuttle means has opposing planar sides 66 and 67 thereof equipped with elongated slide rails 68, 68 which are slidably supported by and between opposing slide pads 69 mounted transversely across the open interior of the nose piece 50 (see FIG. 2 and 3). In this latter respect, pads 69 extend across top and bottom sides of the hollow interior of foot bush 56 in the illustrated embodiment.

Slidable actuation of the shuttle means is controlled by operation of a suitable power actuator, such as a pneumatic cylinder/piston assembly 70 held by bracket 71 affixed to the upper side of the nose piece (see FIGS. 2 and 3). The piston rod 72 of assembly 70 has its outer end fixed to a transverse transfer arm 73 which is joined to one end of the shuttle means 60 for linearly shifting the same in response to computer controlled operation of assembly 70. Other types of actuators such as motor driven rack and pinion arrangements may be used for this purpose as will be apparent to those skilled in the art.

In order to relate the use and operation of the shuttle means to the particular riveting task of the herein illustrated embodiment, details of the individual tools associated with the shuttle means 60 will now be described.

Figure 4:
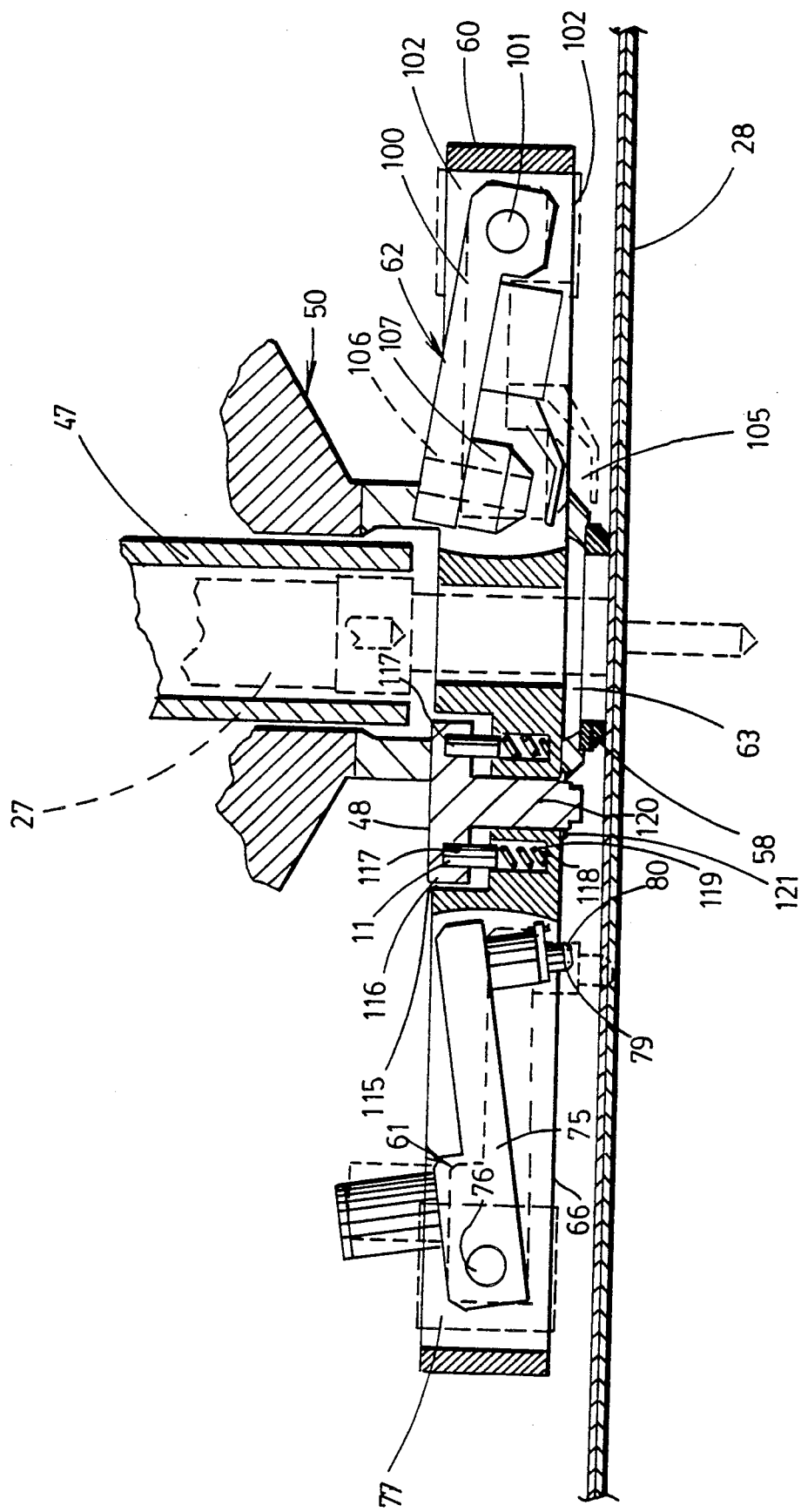
FIG. 4 is cross sectional view taken substantially along vantage line 4—4 of FIG. 2 and looking in the direction of the arrows thereon.

With initial reference to FIGS. 2-4, it will be seen that the sealant applicator module 61, comprises an elongated metal body 75 pivotally supported within an elongated cut out in applicator body 65 by pivot axel 76 which extends through the top and bottom walls 66 and 67, respectively, of the shuttle means. Such axel is rotatably supported in bearings near one end of the shuttle body 65, and is press fitted or otherwise locked to the applicator body 75. An electromagnetic motor 77 is fixed to one end of axel 76 to rotate the latter and applicator 61 upon command of the control computer. Thus arcuate or limited pivotal movement of applicator 61 between a dotted line (inactive) position and a full line (active) position thereof as shown in FIG. 5 is periodically effected by motor 77.

Figure 5:
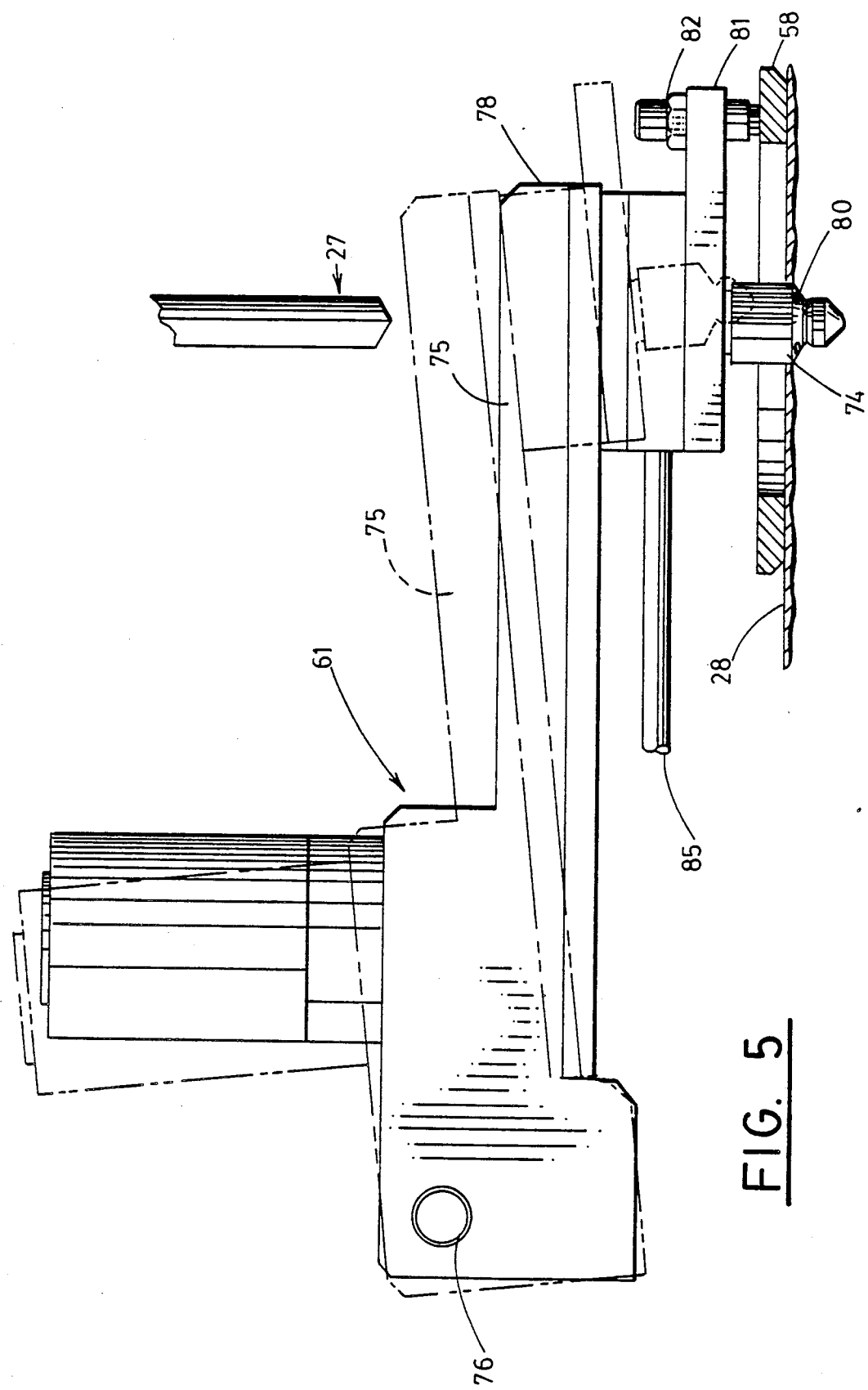
FIG. 5 is an enlarged plan view of the sealant applicator module shown in FIG. 4.

It will be noted that depending or projecting outwardly of the non-pivotally supported end 78 of applicator body 75, is a sealant nozzle 79 having plural discharge openings 80 for distributing sealant to a rivet opening in the work pieces 28 (see FIG. 5).

Extending beyond the outer end of the applicator's body is a support arm 81 having an adjustable stop means 82 designed to limit movement of the applicator body toward the work pieces whereby to properly align the nozzle 79 within a hole formed by drill 27 in the fixture held work pieces. As shown in FIG. 5 this limiting action is effected by engagement of stop means 81 with the inside face of the sensor ring 58 at the outer end of the nose piece 50.

It will be understood that in response to selected indexing movement of the shuttle 60, followed by selected arcuate movement of the applicator 61, from its dotted to its full line position, as indicated in FIG. 5, the applicator nozzle 79 is positioned within the upper end of a hole drilled through the work pieces 28, ready to apply sealant to the opening and the counter sunk end thereof prior to the introduction of a rivet fastener therein.

In order to accomplish this task the applicator nozzle must be supplied with sealant material and according to the present invention, rotated to evenly distribute sealant about the mouth of and within the rivet opening.

Figure 6:
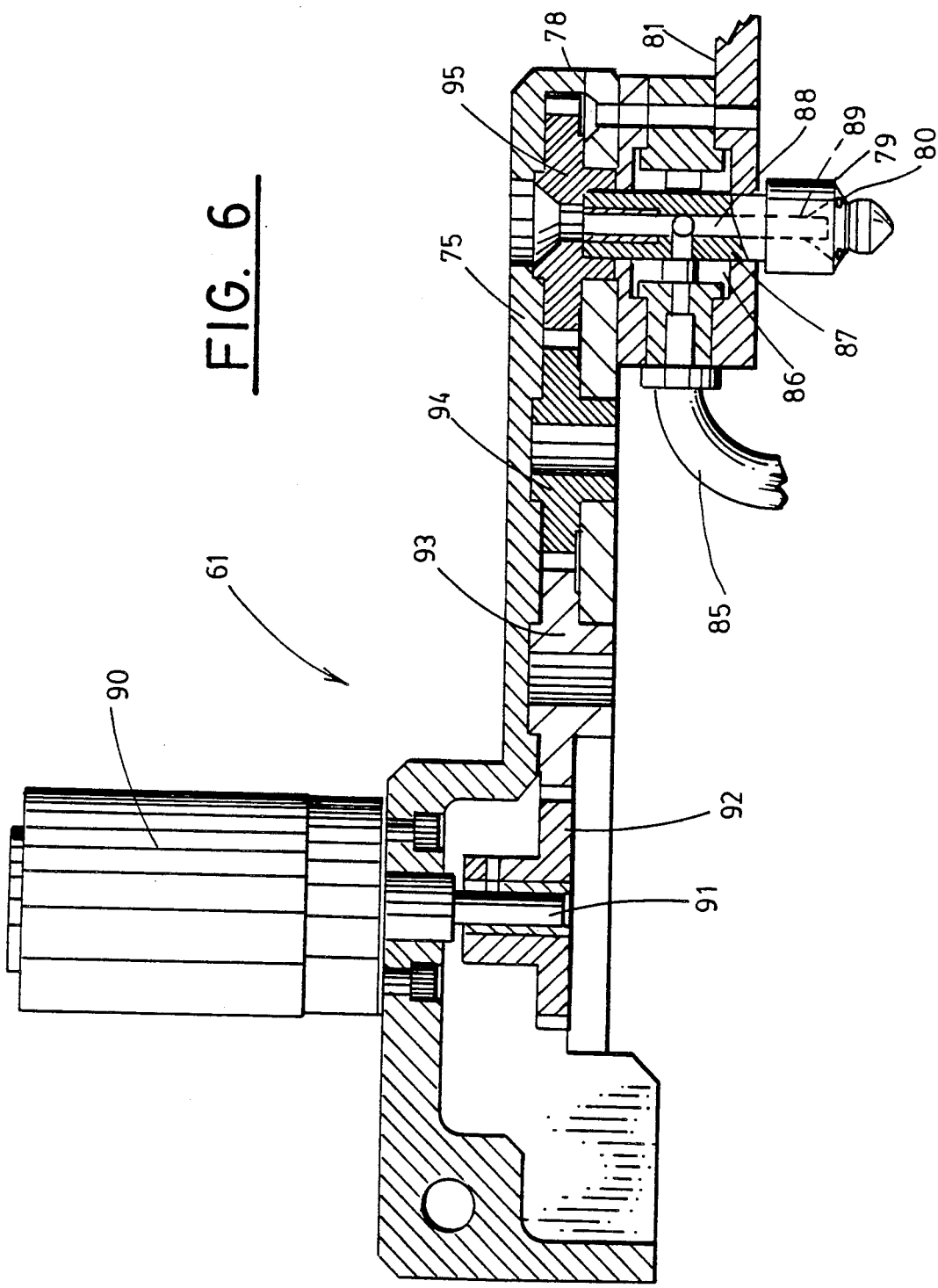
FIG. 6 is a partial transverse cross section taken longitudinally through the sealant applicator module shown in FIG. 5.

To this end reference is made now to FIG. 6, which shows the internal working arrangement of the applicator assembly 61. As therein shown sealant is supplied via flexible hose 85 to an annular chamber 86 surrounding a rotatably supported hollow spindle shaft 87 mounted within the outer end 78 of the applicator. Sealant enters a hollow coaxial passageway 88 of the shaft and is distributed to the openings 80 in nozzle 79 via internal passageways 89, indicated by dotted lines in FIG. 6.

As noted heretofore the nozzle 79 is rotatable to distribute sealant evenly over the rivet openings. To accomplish this function, an electromagnetic motor 90 is affixed to body 75 of the applicator adjacent its pivot center to selectively rotate, upon computer command, motor driven drive shaft 91 fixed to a drive gear 92. Three additional rotatably mounted gears 93, 94 and 95 are driven by gear 92, with gear 95 being fixed to the upper end of the spindle shaft 87 to effect rotation of that shaft and nozzle 79 upon energization of motor 90.

Once the applicator nozzle has completed its distributing operation, motor 77 is reversely energized to move the applicator to its retracted position, shown in FIG. 4. The shuttle is then reversed to bring the rivet feed apparatus 62 into operating position, as will appear presently.

Figure 7:
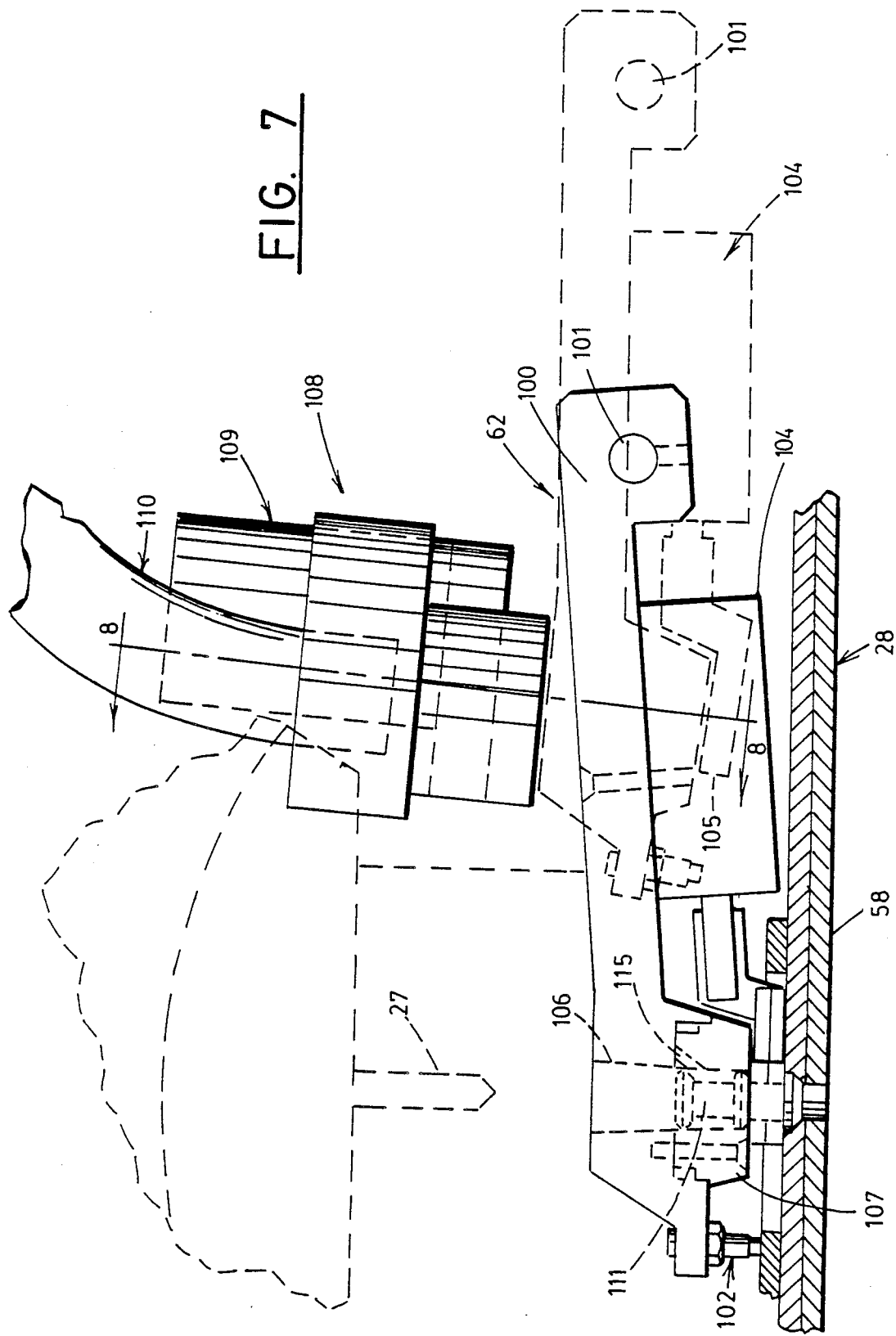
FIG. 7 is an enlarged plan view of the rivet feed and inserting apparatus shown in FIG. 4, with portions thereof in section.
Figure 8:
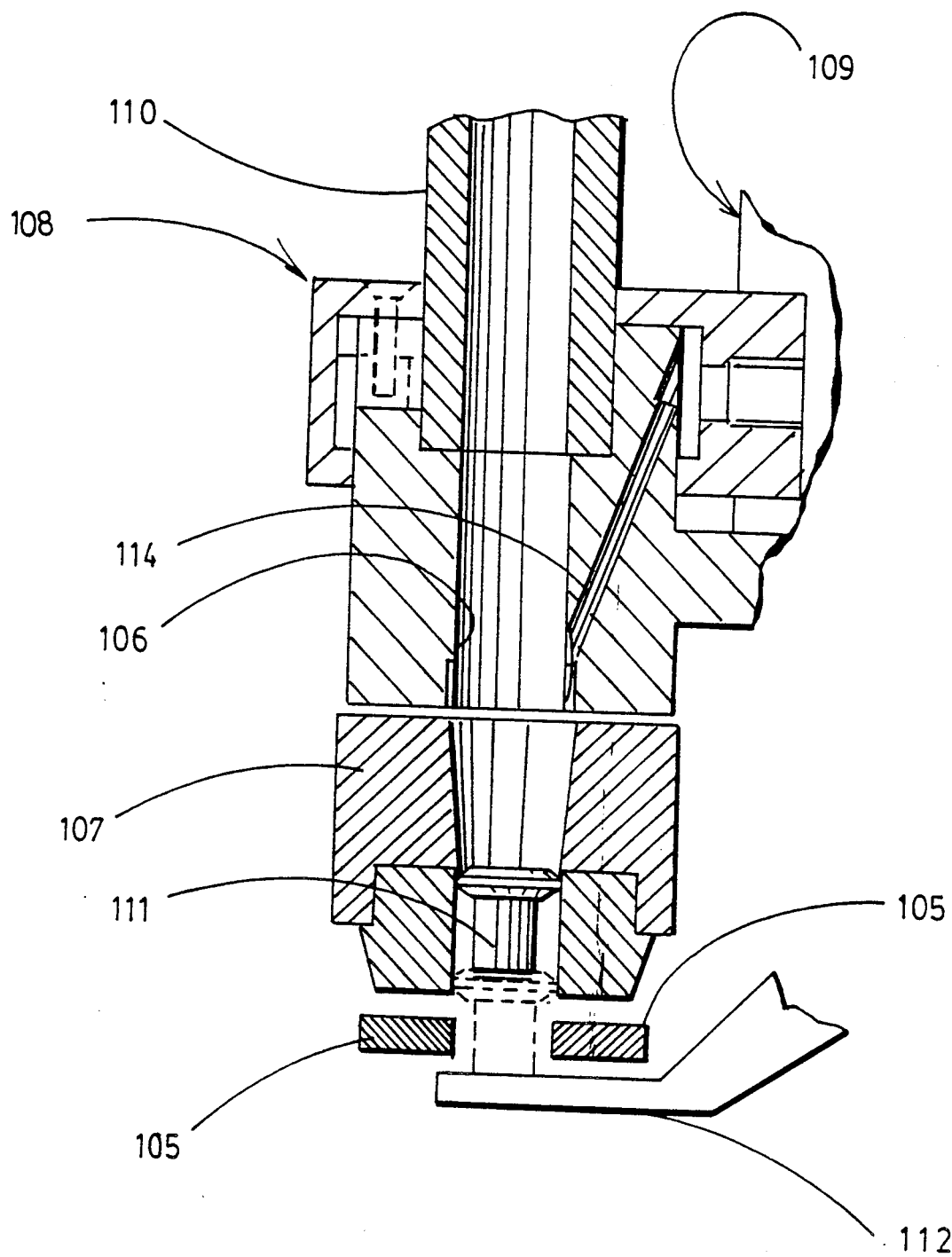
FIG. 8 is an enlarged cross section taken along vantage line 8—8 of FIG. 7 and looking in the direction of the arrows thereon.
Figure 9:
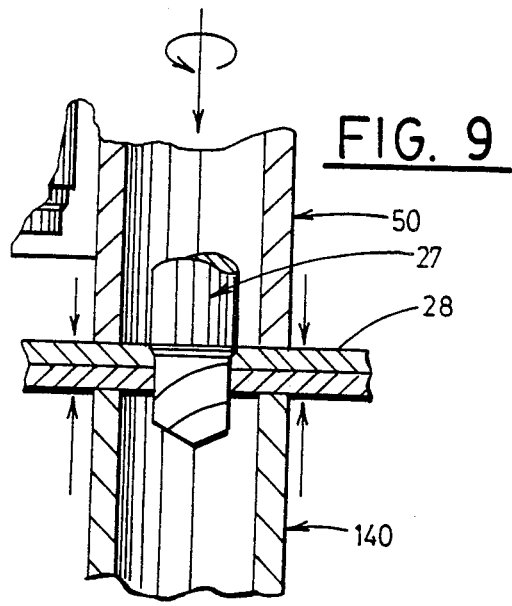
FIGS. 9-13 are schematic elevations with parts in section illustrating the successive steps of rivet installation.
Figure 10:
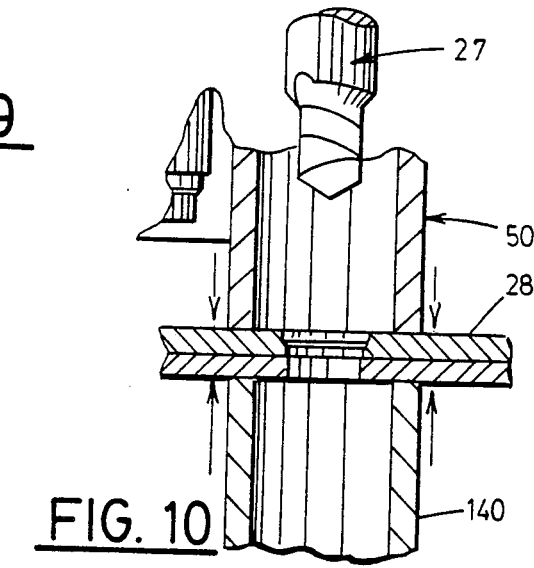
Figure 11:
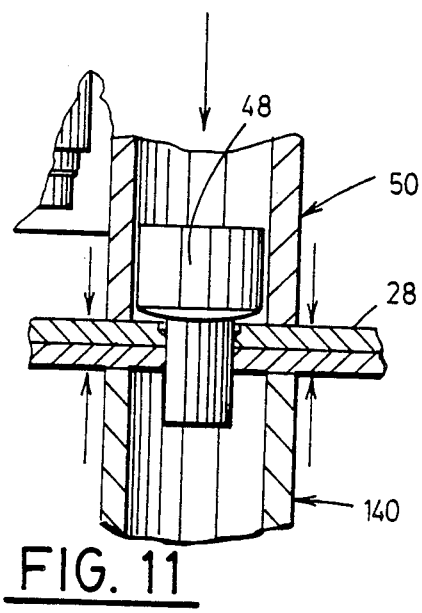
Figure 12:
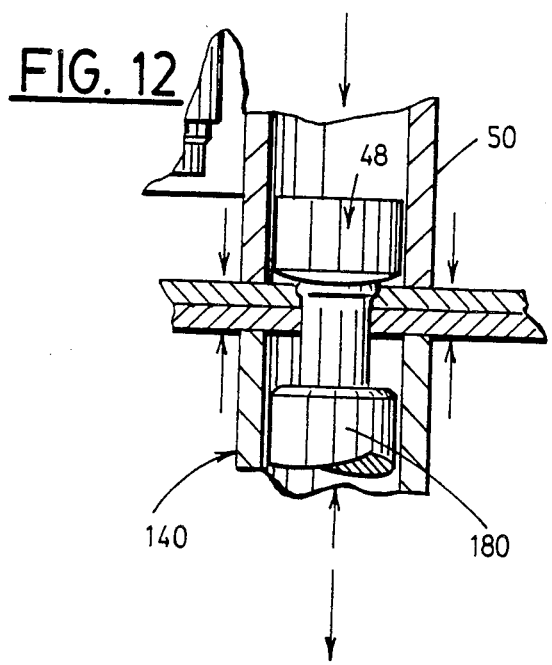
Figure 13:
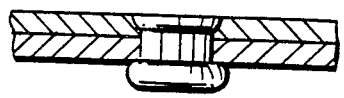

With reference to FIGS. 4, 7 and 8 of the drawings features of the rivet feed station apparatus 62 will become apparent. As shown in FIG. 4, apparatus 62 comprises an elongated body 100 (generally similar to the applicator body 75) which is pivotably supported near one end on a pivot shaft 101 for limited arcuate movement within a cut out interior opening formed near one end of the shuttle body as with the sealant applicator. Such pivotal movement of body 100 is responsive to selected actuation of an electromagnetic motor 102 for rotating shaft 101, (see FIG. 1) as in the corresponding operation of sealant applicator 61. Also like the sealant applicator the rivet feed apparatus is linearly moveable with the shuttle body between a rivet receiving position (shown in full lines in FIG. 4 and dotted lines in FIG. 7) and a rivet discharge position, shown in full lines in FIG. 7. Stop means 103 at the outer end of body 100, engages sensor 58 to limit movement of body 100 toward the work pieces 28.

Mounted to the underside of the body 100 is a pneumatic gripper mechanism 104, for holding rivets fed in apparatus 62 while the latter is being moved between its rivet receiving and discharge positions. Mechanism 104 is characterized by a pair of laterally moveable scissor type gripper fingers 105, adapted to grip and hold rivets therebetween in response to signals from the end effector control computer. One such gripper mechanism suitable for this purpose is commercially available from SMC Pneumatics, Inc. (MHC Series).

In order to deposit rivets between the gripper fingers 105, apparatus 62 is provided with an open feeder channel 106 extending transversely through body 100 to communicate with a feeding head 107 mounted adjacent the non-pivotally supported end of body 100. A stationary pneumatic feed and rivet supply system 108 having a pressurized air tank 109 and a flexible rivet supply hose 110 operates to position selected rivets 111 within channel 106 for deposit against a stop 112 located opposite the discharge end of feeding head 107 (see FIG. 8). The stop limits projection of the rivet tail or body beyond feeding head 107 for engagement by the gripper fingers 105 (see FIG. 8). It will be noted that this rivet stop function is necessary to insure that the shuttle and gripped rivet clear the nose piece as the rivet feed assembly and shuttle is translated into its rivet discharge position, indicated in full lines in FIG. 7. It also will be recognized that the channel 106 and feeding head receive rivets from the pneumatic system 108 only when apparatus 62 is in its retracted rivet receiving position, as shown in dotted lines in FIG. 7.

Once a rivet 111 is positioned coaxially over a hole previously formed through the work pieces it is ready for insertion into such hole. This is accomplished by opening the gripper fingers 105 to release the rivet. Simultaneously a blast of compressed air is released from chamber 109 into passageway 114 (see FIG. 8) which leads to channel 106, causing air pressure to force a rivet 111 into an opposing rivet opening in the work pieces. Thus the rivet is positioned for upsetting operation after withdrawal of the rivet feed apparatus 62.

It will be recalled that rivets are set by engaging the head end thereof with the bucking bar bushing 48 which is backed up by bucking bar 44 (see FIG. 1). It also will be recalled that bushing 48 is located between the sealant applicator 61 and rivet feed assembly 62 in the shuttle (see FIG. 4).

As shown best in FIG. 4, the bucking bar bushing 48 comprises a solid bodied member of generally T-shaped cross section which fits into a suitable socket 115 in the shuttle body. Head 116 of the bushing is generally rectangular with arcuate ends (see FIG. 2) and is engaged by the outer end 47 of the bucking bar 44 when bushing 48 is in coaxial alignment with the quill axis of the robot (see FIG. 1). Guide pins 117, 117 extend from the lower side of head 116 into guide bores 118 in the shuttle body and work against return springs 119 to give a limited floating action to the bushing 48.

The cylindrical stem 120 of the bucking bar bushing extends through the body of the shuttle and is locked axially by a C-ring 121 at its outer end. The extreme outer end of the bushing stem 120 clears the nose piece 50 by virtue of an appropriate side opening cut-away portion 122 in the sensor ring 58 (see FIG. 3).

Turning now to the features of the cooperating single task end effector 21, reference is made to FIG. 1, from which it will be understood that such comprises a generally cylindrical head 130 having an attached interface bell 131 and face plate 132 adapted for connection to the twist head 133 of an associated robot by means of a known automatic coupling system. Bell 131 also includes means for automatically coupling to pneumatic hydraulic and electrical power supply sources and connectors carried by the robot whereby to power corresponding power systems of end effector 21.

Joined to the outer end of bell 131 is the main body 134 of the end effector head 130 which is annular and carries a cylindrical bushing bearing 135 for rotatably supporting a generally cylindrical retention member 136 distinguished by a semi-spherical socket 137 formed of its outer end. Socket 137 matingly receives the semi-spherical base end of a generally T-shaped nose piece 140 which is held in socket 137 by plural spaced connecting linkage and spring assemblies 141 having associated sensor means 142, similar to the heretofore described mounting of nose piece 50 of end effector 20.

As with nose piece 50, nose piece 140 aligns itself perpendicular to the work pieces engaged thereby. Sensor means 142 respond to such nose piece alignment to insure coaxial positioning of the robot's twist head 133 and the central or prime axis of nose piece 140 prior to initiating a riveting cycle.

Nose piece 140, as shown in FIG. 1, has one side of its cylindrical outer end or foot bush cut away to provide a flat surface 143 thereon for clearing a longeron frame member 144 in the herein illustrated embodiment. It will be appreciated that member 144 is secured in place with work pieces 28 and that the longeron is a generally arcuate frame member, depending on the shape of the work piece assembly, as in an airplane hull or wing section. Consequently, it is frequently necessary for the nose piece 140 to be selectively rotated about its prime axis so that the cut-away side thereof can clear the curvature of the longeron.

To accomplish this function retention member 136 is rotatably supported in bearing 135 so that rotation of member 136 also rotates the nose piece 140 about its prime axis. For this purpose a large transmission gear 145 is fixed to the inner end of member 136 and engaged with idler gear 146 supported on stub shaft 147 carried by the head member 130. A driving gear 148, fixed to a shaft 149 is rotatably driven via electric or pneumatic motor 150 and gear reducer 151 supported on interface bell 131 and controlled by the end effector computer. In this respect a prim axis positioning feed back means 152 has a shaft 153 fixed to rotate with drive gear 148 whereby to signal the computer when the nose piece has been rotated a requisite number of degrees thereby effecting deenergization of motor 150.

Arranged coaxially with the interface bell 131, is an annular cylinder 160 for actuating a cylindrical foot bush piston 161 (double acting) which is suitably sealed with cylinder 160 by moveable and stationary seals 162 and 163, respectively. The outer end of piston 161 is fixed to head 130 of the end effector 21 so that application of pressurized fluid, such as air, to the end chamber 164 of cylinder 160 serves to move the piston 161 and nose piece toward and into engagement with the longeron and work pieces. Reverse movement of piston 161 is brought about by venting chamber 164 and pressurizing chamber 165 to reverse movement of piston 161.

When the two nose pieces 50 and 140 are pressed against the assembled work pieces, sensor 55 on nose piece 50 signals the end effector computer to regulate the clamping pressure at a preselected level to avoid stressing the work pieces and the holding fixture during the ensuing rivet preparation and installation cycles.

Mounted coaxially within the cylindrical interface bell 130 is a rivet setting hammer assembly 170, of relatively massive structure comprising a cylindrical hammer slide 171 moveably supported by annular slide bearings 172, 172 and carrying seals 173, 174 engageable with the cylindrical interior of bell 130 to formulate an annular pneumatic piston chamber 175 for linearly moving the hammer slide 171. A stationary seal means 176 also extends between the interior wall 177 of the bell 131 and slide 171.

Introduction of pressurized air into one end of chamber 175 serves to advance slide 171 toward the nose piece 140 while reverse movement thereof is effected by introducing pressurized air into the other end of chamber 175; on the opposite side of such the seal means 173.

Carried coaxially within the hammer slide 171 is a pneumatic hammer assembly 180 having a reciprocating or vibratory hammer 181 at its outer for engaging and upsetting the tail end of a rivet inserted through the work pieces and longeron, as herein illustrated.

OPERATION

Having described the various elements and assemblies involved in the improved end effector of this invention, typical rivet installing operation takes place generally according to the following procedure:

Initially the two robots are positioned so that the twist heads thereof are generally perpendicular to the parts 28 to be assembled, the end effectors thereon being coaxially aligned and positioned substantially two inches apart, ready to approach opposite sides of the parts. End effector 20 is then moved to engage the outer end of its nose piece with the work pieces 28, aligning itself perpendicular to the engaged work piece surface. In this regard it will be recalled that the spherically mounted nose piece 50, signals via sensors 55, its condition of perpendicularity relative to the engaged work pieces. At engagement the robot computer checks the alignment indicated by sensors 55, and adjust the twist head of the robot so that the quill axis of the robot and the prime axis of the end effector, are coaxial. At this juncture the shuttle 60 of end effector 20 is aligned so that the drilling station 63 is coaxial with the quill axis of the robot, and drill 27 is withdrawn or retracted along with the hollow bucking bar 44, preparatory to a drilling operation.

Following engagement and alignment of the end effector 20 with the fixture mounted work pieces, end effector 21 is advanced in coaxial alignment with the end effector 20 until it engages the longeron 144, or if that item is absent from the assembly it engages the work pieces 28 with its nose pieces 40. The angularity of the spherical nose piece is checked against prescribed design limits and the twist head of end effector 21 is adjusted into coaxial alignment with nose piece 140.

The chamber 164 associated with the foot bush piston 161 is then advanced to engage the nose piece with the parts assembly at a pre-determined clamping force established by a computer controlled valving system. With the work pieces thus securely clamped between the nose pieces of the two end effectors, the material thickness is measured by the computer, based on the positioning of the two end effectors and robots, Fastener selection sequence is then initiated to feed a proper fastener to the assembly 62. The quill on the spindle of the first robot is then activated to start hole preparation process during which the depth, drill speed and feed rate plus thrust forces are constantly monitored and controlled.

After hole preparation cycle is completed the quill withdraws or retracts tool 27, providing clearance for the multi-task shuttle system of end effector 20 which thereupon is moved by actuator assembly 70 to position the sealant applicating module 61 coaxially of the quill axis for the aligned end effectors. Once in this position the sealant module is arcuately activated and the applicator thereof rotatably operated to apply sealant to the hole and the countersink previously formed by tool 27.

Upon completion of the sealing applicating function, the sealant module is withdrawn from the rivet hole and the shuttle is activated to position the fastener assembly 62 in alignment with the rivet hole for insertion of the previously select fastener therein. In this respect it will be recalled that upon withdrawal or release of the fastener from the gripper means the fastener is inserted into the drilled hole under pneumatic pressure. When this is completed the shuttle 60 is moved to position the bucking bar bushing 48 opposite the loaded fastener. The outer end of the bucking bar 44 is then engaged with the bucking bar bushing 48 causing the latter to engage the head of the fastener.

The holding force exerted by the bucking bar against the fastener head is fully programmable and constantly monitored throughout the rivet setting operation with the weight of the bucking mass being automatically compensated for and adjusted by the computer to a neutral condition.

The second robot then moves the vibratory hammer 180 into engagement with the tail end of the rivet fastener and again the value of the pressure against the rivet tail exerted by the hammer tool 181 is fully programmable and constantly monitored throughout the rivet fastener setting cycle. Vibratory upsetting of the tail end of the rivet is then initiated and such factors as vibratory tool power, force against the rivet tail, installation time and rivet upset height are monitored with such information being supplied to the controlling computers. During the setting of the rivet pressures on the head and tail ends of the rivet may be varied to optimize installation time although generally the manufactured head end of the rivet is engaged with a pressure slightly greater than the upset tail of the rivet to insure proper seating of the manufactured rivet head.

This sequence of operations other than the application of the sealant are illustrated schematically in FIGS. 9–13 of the drawings which set forth the hole preparation, rivet insertion and upsetting operations. Once the rivet is set to the satisfaction of the prescribed parameters, the bucking bar and hammer are withdrawn and the two end effectors are separated releasing the work pieces. The robots then are moved opposite the next hole location and the foregoing cycles repeated.

In order to reduce cycle time, as the robots are being moved between holes all of the internal slides and shuttle systems are reset to their initial starting positions, ready for the next cycle.

In view of the foregoing it is believed that those familiar with the art will readily understand and appreciate the novel advancement of the present invention over the prior art and will appreciate that while the invention has herein been described in association with a preferred embodiment as illustrated in the accompanying drawings the same is nevertheless susceptible to wide variation, modification and substitution of equivalents without departing from the spirit and scope of this invention which is intended to be unlimited by the foregoing description except as may appear in the following appended claims.

The embodiments of the invention in which an exclusive property or privilege is claimed are defined as follows:

1. A multi-task end effector attachable to the articulatably moveable twist head of a computer controlled robot capable of imparting multiple linear and rotational axis movements to the end effector, comprising:
   generally cylindrical interface means for detachably connecting the end effector coaxially over the outer end of the robot's twist head; said interface means also coupling power actuated means of the end effector to power supply systems of the robot;
   a generally cylindrical tool head having an elongated hollow body connected coaxially to the outer end of said interface means,
   a generally cylindrical nose piece mounted coaxially over the outer end of said body for limited pivotal movement relative thereto; and
   sensor means responsive to pivotal movements of said nose piece for indicating non-coaxial alignment of said nose piece and body.

2. The end effector of claim 1, wherein said tool head body has a concave semi-spherical outer end surface, and said nose piece has a semi-spherical inner end surface.

3. The end effector of claim 2, and plural spring loaded linkage means extending between and interconnecting said nose piece and tool head body so that the semi-spherical end surfaces thereof are matingly engaged, and whereby said nose piece is afforded limited pivotal movement about its inner end.

4. The end effector of claim 3, wherein a said sensor means is coupled to each of said linkage means at arcuately spaced locations about the outer end of said tool head.

5. The end effector of claim 1, and shuttle means moveably mounted on said nose piece for supporting a plurality of selected tools thereon.

6. The end effector of claim 5, wherein said shuttle means comprises an elongated member mounted on said nose piece for bi-directional linear movement transversely across the central axis of said nose piece, said tools being mounted at tool stations spaced along the length of said elongated member.

7. The end effector of claim 6, and power actuated means operable selectively to move said member to index each of the tools thereon into coaxial alignment with said central axis of said nose piece.

8. The end effector of claim 6, wherein said shuttle means comprises power actuated sealant applicator means operable to apply sealant to a fastener hole formed in work pieces supported adjacent the outer end of said nose piece.

9. The end effector of claim 8, wherein said sealant applicator means, comprises a pivotally mounted body portion, sealant dispersing means extending from one end of said body portion comprising a rotatably driven nozzle means for distributing sealant, means for supplying sealant to said nozzle means, power actuated means for rotating said nozzle means, and additional power actuated means for pivotally moving said body member between predetermined limits.

10. The end effector of claim 6, wherein said shuttle means supports fastener supply means for inserting selected fasteners into fastener openings formed in work pieces positioned adjacent the outer end of said nose piece; means mounting said fastener supply means for movement about an axis remote from the central axis of said nose piece, and power actuated means for effecting limited movement of said fastener supply means between fastener receiving and discharge positions.

11. The end effector of claim 10, characterized by said fastener supply means comprising an elongated body portion, and said means mounting said fastener supply means comprises a pivot shaft fixed transversely through said body portion and rotatably supported on said shuttle means, and motor means connected to said pivot shaft for rotating the same whereby to pivotally actuate said body portion between said fastener receiving and discharge positions.

12. The end effector of claim 6, wherein said shuttle means carries fastener supply means for feeding selected fasteners into fastener openings formed in work parts confronted by said nose piece comprising; a moveably supported body portion having a fastener receptive chamber adjacent one end, means operable to feed fasteners into said chamber when said body portion is in a first position, means for moving said body portion between said first position and a second position when said chamber is indexed by said shuttle means into coaxial alignment with the central axis of said nose piece, selectively operable means for holding said fastener in said chamber during movement of said body portion to said second position and for releasing the fastener for discharge from said chamber, and means for positively discharging said fastener from said chamber.

13. The combination of claim 12, wherein said means for discharging said fastener from said chamber comprises a stream of pressurized air released into said chamber to force said fastener therefrom.

14. The end effector of claim 7, wherein said shuttle means comprises moveably mounted bushing means at one of said stations which is adapted to reciprocate along an axis coincident with the central axis of said nose piece when indexed by said shuttle into alignment therewith, bucking bar means mounted coaxially within said tool head, power actuated means for axially advancing and retracting said bucking bar means into and out of engagement with said bushing, and a stem portion on said bushing for engaging the head of a fastener coaxially aligned therewith and located in a fastener opening formed in work parts opposingly engaged by the outer end of said nose piece.

* * * * *